United States Patent
Xu

(10) Patent No.: US 9,944,531 B2
(45) Date of Patent: Apr. 17, 2018

(54) SLUDGE RECYCLING TREATMENT SYSTEM OF URBAN SEWAGE PLANT

(71) Applicant: YIXING NEW JINSHAN ENVIRONMENTAL PROTECTION EQUIPMENT CO., LTD., Yixing, Jiangsu (CN)

(72) Inventor: Tao Xu, Yixing (CN)

(73) Assignee: YIXING NEW JINSHAN ENVIRONMENTAL PROTECTION EQUIPMENT CO., LTD., Jiangsu (CN)

(*) Notice: Subject to any disclaimer, the term of this patent is extended or adjusted under 35 U.S.C. 154(b) by 161 days.

(21) Appl. No.: 14/882,889

(22) Filed: Oct. 14, 2015

(65) Prior Publication Data

US 2016/0376157 A1 Dec. 29, 2016

(30) Foreign Application Priority Data

Jun. 25, 2015 (CN) .......................... 2015 1 0356483

(51) Int. Cl.
*C01B 31/08* (2006.01)
*C02F 11/12* (2006.01)
(Continued)

(52) U.S. Cl.
CPC .......... *C01B 31/081* (2013.01); *C01B 32/324* (2017.08); *C01B 32/366* (2017.08);
(Continued)

(58) Field of Classification Search
CPC .......... C02F 11/12; C02F 11/123; F26B 3/28; F26B 3/283; F26B 3/286; C01B 31/081;
(Continued)

(56) References Cited

U.S. PATENT DOCUMENTS 4,226,325 A * 10/1980 Vandas .................. B65G 45/02
118/70
4,249,317 A * 2/1981 Murdock ................ F26B 3/286
159/903

(Continued)

FOREIGN PATENT DOCUMENTS

| CN | 102689898 | * | 9/2012 |
| CN | 104556622 | * | 4/2015 |
| JP | 3811834 B2 | * | 8/2006 |

OTHER PUBLICATIONS

Smalis, Conveyor/Radial Stackers, 2013.*

*Primary Examiner* — Steven B McAllister
*Assistant Examiner* — Steven Anderson, II
(74) *Attorney, Agent, or Firm* — Oliff PLC

(57) ABSTRACT

A sludge recycling treatment system of an urban sewage plant includes solar sludge drying and sludge roasting and activated carbon manufacturing devices. The solar sludge drying device has a sealing box, flat plate conveyor belts, and a conveyor belt traction device. The sludge roasting and activated carbon manufacturing device has a rotary kiln and feeding, conveyor, discharging, and flue gas recycling apparatuses. The flat plate conveyor belts are stepped and concave-convex manufactured from stainless or anti-corrosion carbon steel. Sludge roasting and activated carbon manufacturing is implemented mainly by a rotary kiln to heat a rotary drum wall therein to heat materials. The kiln has automatic feeding and discharging apparatuses. Harmless treatment and resource utilization of urban sludge converts the sludge from waste to wealth, and fully utilizes solar energy to reduce energy consumption during sludge treatment. During production and operation, no reagent is needed, and no secondary pollution is caused.

7 Claims, 6 Drawing Sheets

(51) Int. Cl.
*C01B 32/324* (2017.01)
*C01B 32/366* (2017.01)
(52) U.S. Cl.
CPC ........... *C02F 11/123* (2013.01); *Y02P 20/134* (2015.11); *Y02W 10/37* (2015.05)
(58) Field of Classification Search
CPC ... C01B 31/086; C01B 32/324; C01B 32/366; C10M 173/025
See application file for complete search history.

(56) References Cited

U.S. PATENT DOCUMENTS

| | | | | |
|---|---|---|---|---|
| 4,559,235 | A * | 12/1985 | Miller | A23N 17/00 |
| | | | | 426/518 |
| 5,057,009 | A * | 10/1991 | Nechvatal | C04B 18/027 |
| | | | | 110/165 A |
| 7,455,170 | B2 * | 11/2008 | Beauchamp | B65G 45/08 |
| | | | | 184/15.1 |
| 8,241,098 | B1 * | 8/2012 | Latimer | A01D 41/1217 |
| | | | | 198/313 |
| 2007/0227417 | A1 * | 10/2007 | Aguayo | C10B 7/06 |
| | | | | 110/246 |
| 2013/0333236 | A1 * | 12/2013 | Grosser | F26B 3/286 |
| | | | | 34/239 |

* cited by examiner

SLUDGE RECYCLING TREATMENT SYSTEM OF URBAN SEWAGE PLANT

BACKGROUND

Technical Field

The present invention relates to a sludge recycling treatment system of an urban sewage plant, and in particular, to a device that processes wet sludge by combining closed solar sludge evaporation and drying, and rotary sludge roasting and activated carbon manufacturing.

Related Art

In the prior art of sludge evaporation treatment by solar energy, sludge is dried mainly by using a solar evaporator, which has such advantages as simplicity and practicality of devices, a short processing flow, and a good quality of discharged water, and has a disadvantage that conveyor belts of a solar sludge evaporation treatment device use materials of cloth and rubber, and the rubber is easily aged, thereby generating a new pollutant under a high temperature.

At present, there is no feasible method for achieving industrialization of activated carbon manufacturing from sludge. Because a moisture content of the sludge is high (about 80%), if a drying process with an external heat source is directly used for drying and activated carbon manufacturing, a heat energy consumed is excessively great and a processing cost is also very high. Moreover, hot humid air needs to be discharged during the drying process. The hot humid air has an excessively offensive odor, and a deodorization cost is also very high, so that process requirements and market demands cannot be satisfied. If a deep dehydration and drying process is used, many inorganic matters such as flocculants and lime need to be added during deep dehydration of wet sludge. After addition of the inorganic matters, pores are difficultly formed during activated carbon manufacturing, and an external heat source is further needed subsequently for drying. Therefore, the prior art is still not mature enough no matter in process or operation cost.

SUMMARY

An objective of the present invention is to provide a sludge recycling treatment system of an urban sewage plant, to overcome the foregoing disadvantages of the prior art, where the sludge recycling treatment system has a low production cost and a long service life of a device.

The technical solutions used in the present invention are as follows:

A sludge recycling treatment system of an urban sewage plant is provided, including a closed solar sludge drying device and a sludge roasting and activated carbon manufacturing device, where the closed solar sludge drying device includes an upper flat plate manufactured from a highly transparent material, a lower plate and an evaporator box consisting of surrounding frames, where the evaporator box is provided with two or four sets of upper and lower flat plate conveyor belts; the flat plate conveyor belt is provided with traction plates on two ends thereof; the traction plate is connected to one end of a traction rope, and another end of the traction rope is connected to a traction apparatus; the two sets of flat plate conveyer belts are pulled by the traction ropes on two ends thereof to run back and forth inside the evaporator box; and the evaporator box is further provided with a stock distributing and sludge receiving apparatus, and a belt conveyor is disposed under a discharge port of the stock distributing and sludge receiving apparatus; and the sludge roasting and activated carbon manufacturing device includes a hoisting apparatus, a feeding apparatus, a rotary kiln, a material receiving apparatus and a tail gas recovering apparatus, where a discharge end of the belt conveyor is connected to a feed end of the hoisting apparatus; a discharge end of the hoisting apparatus is connected to a feed end of the feeding apparatus; a discharge end of the feeding apparatus is connected to a feed end of the rotary kiln; and a discharge end of the rotary kiln is provided with the material receiving apparatus and the tail gas recovering apparatus.

Multiple conveyor belt supporting members are disposed under the two sets of upper and lower flat plate conveyor belts inside the evaporator box, and round steels are vertically welded onto the conveyor belt supporting members to prevent the flat plate conveyor belts from sliding downwards.

The upper flat plate manufactured from a highly transparent material is manufactured by using a glass product or an organic transparent plastic, and distilled water generated by means of exposing inner sides of the upper flat plate and the lower plate to sunlight rapidly flows downwards to a water outlet and is discharged for recycling.

The upper flat plate uses a single-layer or double-layer structure. When being of a double-layer structure, the upper flat plate is installed in a combined and hollow manner (used in northern cold regions in winter).

The stock distributing and sludge receiving apparatus has a stock distributing system with double functions of smoothing sludge by using a flat plate and then crushing the sludge by using a roller, and a sludge receiving system that is an automatic turnover scraper plate system.

The two sets of upper and lower flat plate conveyor belts inside the evaporator box are stepped concave-convex conveyer belts that are formed by means of welding of a T-section steel and a steel plate, and a material thereof is stainless steel or anti-corrosion carbon steel.

The traction ropes are manufacture by using a material of stainless steel.

The two sets of upper and lower flat plate conveyor belts inside the evaporator box are provided with lubricating apparatuses on two ends thereof, where the lubricating apparatuses are filled inside with lubricating grease; and bottom side lubrication holes are disposed at the bottom of the lubricating apparatuses, so that the lubricating grease is applied through the bottom side lubrication holes to contact surfaces between the flat plate conveyor belts and the supporting members.

The traction plates are manufactured by using a material of stainless steel or anti-corrosion carbon steel.

The present invention has advantageous effects as follows:

Sludge drying and dehydration is implemented by using solar energy, and distilled water that is solar evaporated can be recycled. An operation cost of sludge is reduced. Dry sludge is sintered to form activated carbon, which achieves harmless treatment and resource recycling of urban sludge, converts the sludge from waste to wealth, and fully utilizes solar energy to reduce a cost during a sludge treatment process. No gas with an offensive odor is discharged and no secondary pollution is caused during operation in a closed manner. The conveyor belts are changed from conventional flexible turn-up conveyor belts to existing steel flat plate conveyor belts. The novel flat plate conveyor belts are manufactured from a material of stainless steel or anti-corrosion carbon steel. The present invention greatly improves a sludge loading capacity of the device in respect of performance, reduces an investment cost of the device and prolongs a service life thereof. According to the present invention, sludge that has been dried by using solar energy is directly conveyed by a conveyor belt into a rotary kiln for roasting, so as to manufacture activated carbon. During a process of sludge treatment by solar energy, no reagent is added; while in all other sludge treatment methods, reagents such as flocculants and lime need to be added, thereby increasing a content of inorganic matters in the sludge, so that the sludge cannot be manufactured into activated carbon. Activated carbon manufactured from sludge that has been treated by solar energy has a good performance and a large specific surface area. Compared with activated carbon manufactured from coal, a content of heavy metals in activated carbon formed by means of sludge roasting is lower. Original heavy metals in the sludge are fixed in the activated carbon in a form of oxide after high-temperature roasting, thereby effectively controlling discharge of the heavy metals in the sludge. Particularly, heavy metals from the sludge, such as Hg and Ni are passivated and fixed in the carbon, so that heavy metal ions will not dissolve out again. This technology converts sludge in an urban sewage plant to activated carbon, thereby radically achieving resource recycling of the sludge.

DETAILED DESCRIPTION

Figure 1:
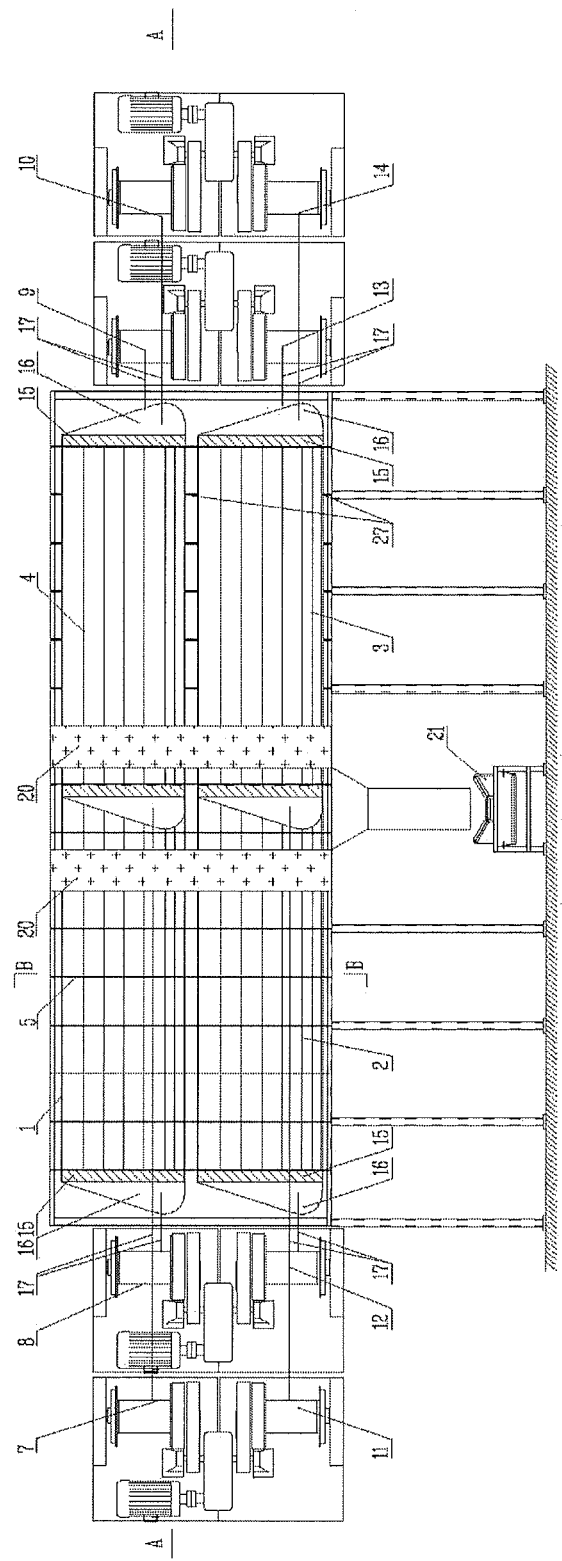
FIG. 1 is a schematic structural diagram of a closed solar sludge drying device according to the present invention.
Figure 2:
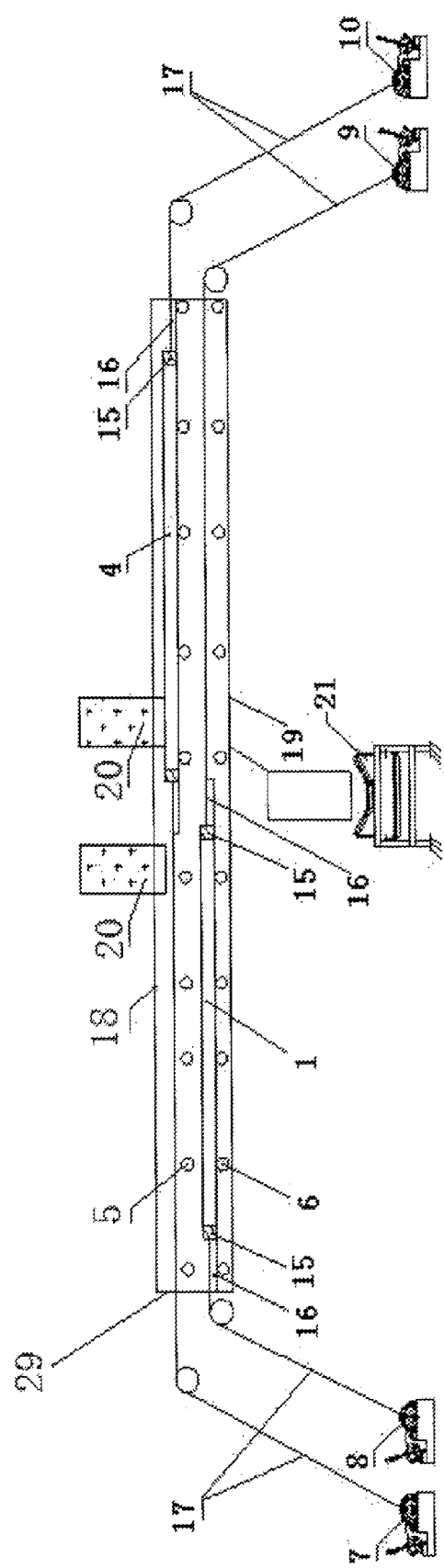
FIG. 2 is an A-A sectional view of FIG. 1.
Figure 3:
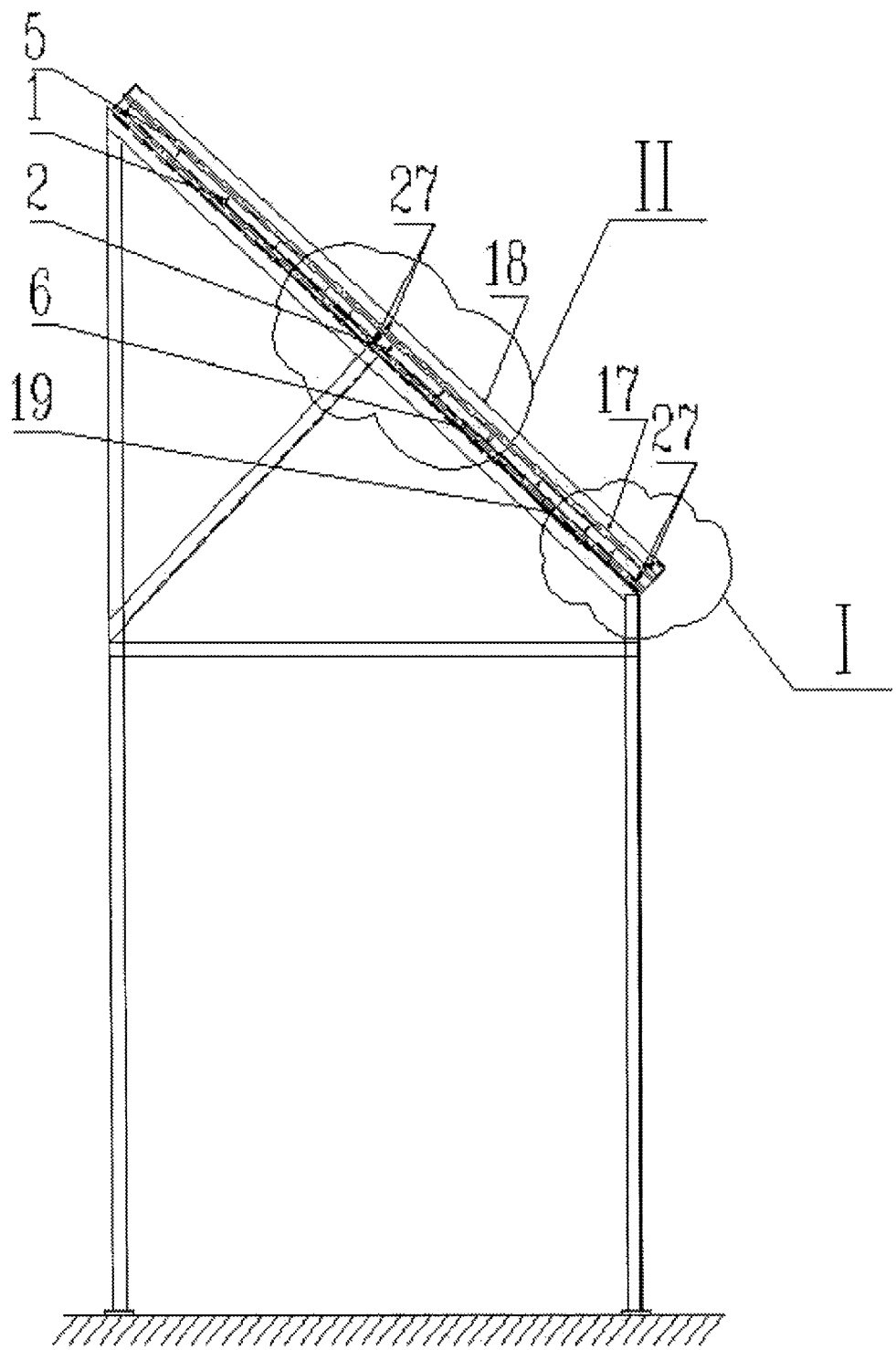
FIG. 3 is a B-B sectional view of FIG. 1.
Figure 4:
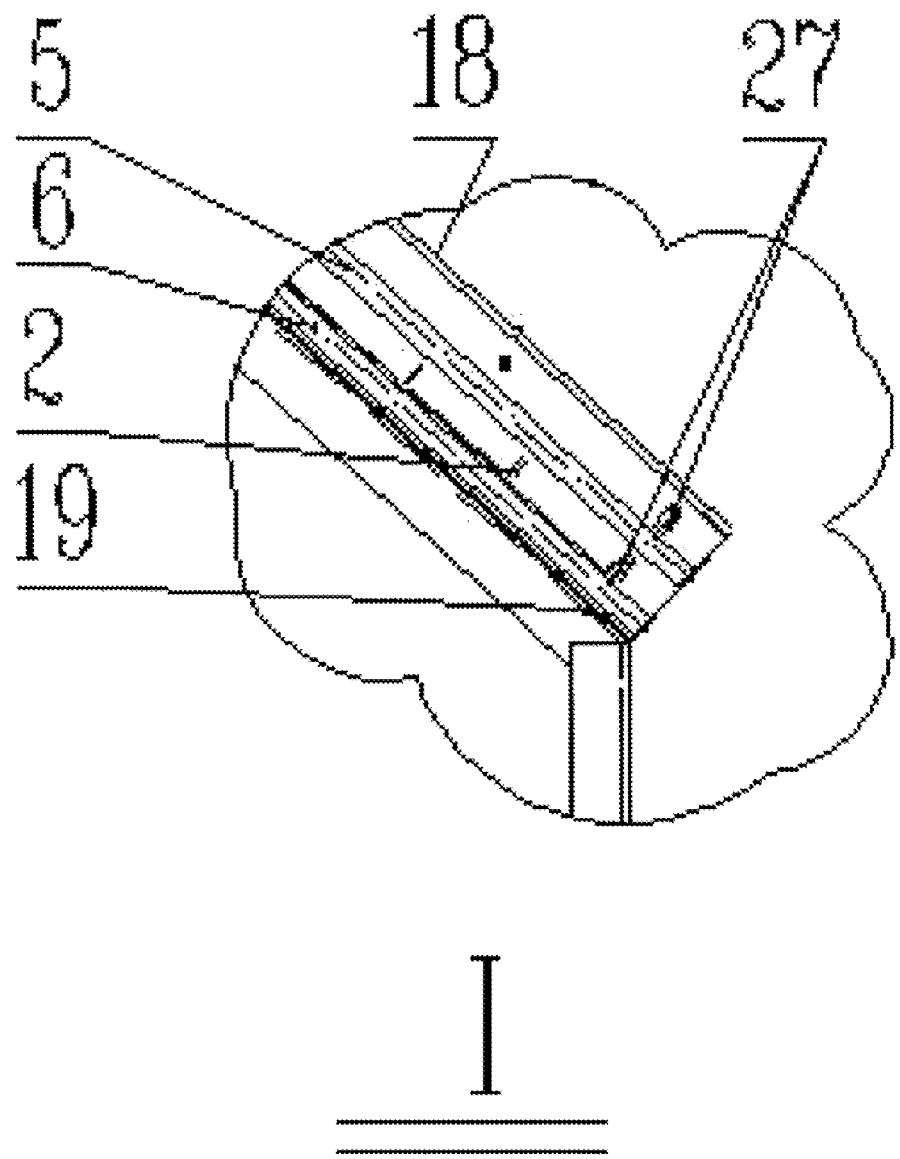
FIG. 4 is a first partial enlarged view of FIG. 3.
Figure 5:
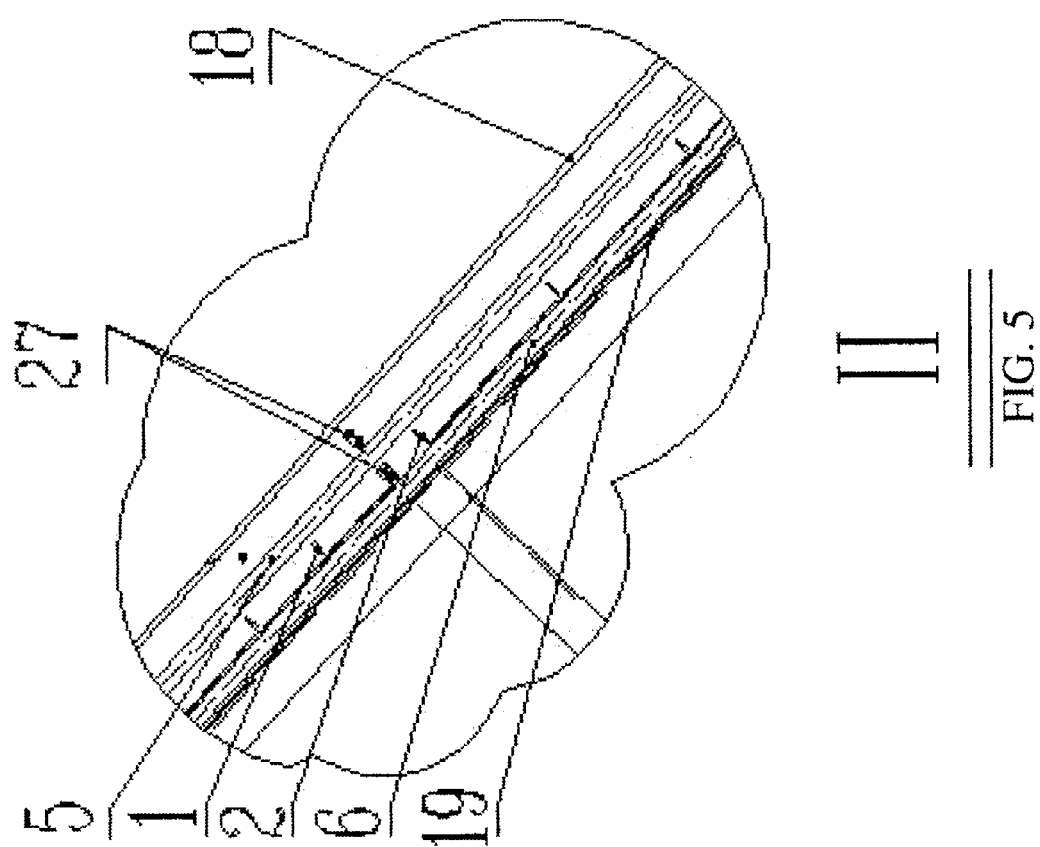
FIG. 5 is a second partial enlarged view of FIG. 3.

The following further describes the present invention with reference to accompanying drawings.

The present invention includes a closed solar sludge drying device and a sludge roasting and activated carbon manufacturing device. As shown in FIG. 1 to FIG. 5, the closed solar sludge drying device includes an upper flat plate 18 manufactured from a highly transparent material, a lower plate 19 and an evaporator box 29 consisting of surrounding frames, where the lower plate 19 is manufactured by using a material of stainless steel or anti-corrosion carbon steel. The evaporator box is provided with two or four sets of upper and lower flat plate conveyor belts. When there are four sets of flat plate conveyor belts, the flat plate conveyor belts include a lower-layer top-side flat plate conveyor belt 1, a lower-layer bottom-side flat plate conveyor belt 2, an upper-layer bottom-side flat plate conveyor plate 3 and an upper-layer top-side flat plate conveyor plate 4. The above flat plate conveyor belts are all provided with traction plates 16 on two ends thereof, where the traction plates 16 are manufactured by using a material of stainless steel or anti-corrosion carbon steel. The traction plate 16 is connected to an end of a traction rope 17, and another end of the traction rope 17 is connected to a traction apparatus. The two sets of flat plate conveyor belts are pulled by the traction ropes 17 on two ends thereof to run back and forth inside the evaporator box. The traction plates 16 ensure connection between the flat plate conveyor belts and the traction ropes 17, and enable the traction ropes 17 to pull the conveyor belts in parallel to run. The traction apparatus of the present invention specifically includes an upper-layer top-side conveyor belt leftward traction apparatus 7, an upper-layer top-side conveyor belt rightward traction apparatus 10, a lower-layer top-side conveyor belt leftward traction apparatus 8, a lower-layer top-side conveyor belt rightward traction apparatus 9, an upper-layer bottom-side conveyor belt leftward traction apparatus 11, an upper-layer bottom-side conveyor belt rightward traction apparatus 14, a lower-layer bottom-side conveyor belt leftward traction apparatus 12 and a lower-layer bottom-side conveyor belt rightward traction apparatus 13. A conveyor belt of the upper flat plate 18 moves leftwards and rightwards on a plane that is formed according to a certain distance by multiple upper-layer conveyor belt supporting members 5, and a conveyor belt of the lower plate 19 moves leftwards and rightwards on a plane that is formed according to a certain distance by multiple lower-layer conveyor belt supporting members 6. Round steels 27 are welded onto the upper-layer conveyor belt supporting members 5 and the lower-layer conveyor belt supporting members 6, to prevent the conveyor belts from sliding downwards. The round steels 27 are welded perpendicular to the upper-layer conveyor belt supporting members 5 and the lower-layer conveyor belt supporting members 6 on bottom sides of the flat plat conveyor belts. A material of the round steels 27 is high hardness wear-proof steel that has been processed by means of high-temperature heating, and that of the traction ropes 17 is stainless steel. The lower-layer top-side flat plate conveyor belt 1, the lower-layer bottom-side flat plate conveyor belt 2, the upper-layer bottom-side flat plate conveyor belt 3 and the upper-layer top-side flat plate conveyor belt 4 are stepped concave-convex conveyor belts that are manufactured from a material of stainless steel or anti-corrosion carbon steel by means of welding of a T-section steel and a steel plate. The two sets of upper and lower flat plate conveyor belts inside the evaporator box are provided with lubricating apparatuses 15 on two ends thereof, where the lubricating apparatuses 15 are filled inside with lubricating grease. Bottom-side lubrication holes are disposed at the bottom of the lubricating apparatuses 15, so that the lubricating grease is applied through bottom-side lubrication holes onto contact surfaces between the bottom of the T-section steel of the flat plate conveyor belts and the upper conveyor belt supporting members 5, and between the bottom of the T-section steel of the flat plate conveyor belt and the lower conveyor belt supporting members 6. The lubricating grease applied by the lubricating apparatuses 15 can greatly reduce a running resistance of the flat plate conveyor belts. The traction plates 16 are disposed on outer sides of the lubricating apparatuses 15. The evaporator box of the present invention is further provided with a stock distributing and sludge receiving apparatus 20, where a belt conveyor 21 is disposed under a discharge port of the stock distributing and sludge receiving apparatus 20. Sludge is evenly distributed onto the flat plate conveyor belts by using the stock distributing and sludge receiving apparatus 20, and the sludge that has been dried by using solar energy is stripped from the flat plate conveyor belts by the stock distributing and sludge receiving apparatus 20, and falls on the belt conveyor 21 in a centralized manner, and then is conveyed to the sludge roasting apparatus by the belt conveyor 21.

Figure 6:
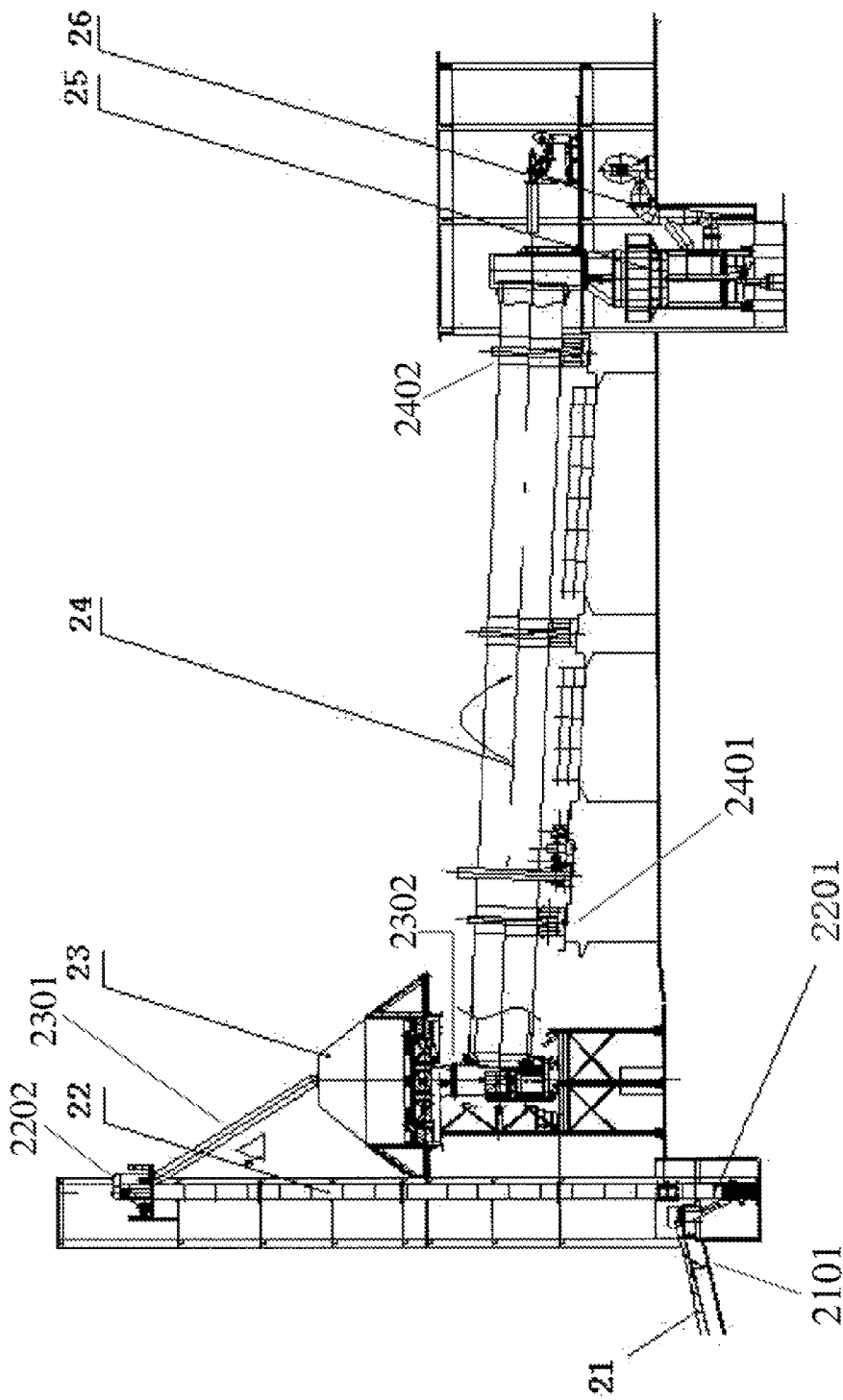
FIG. 6 is a schematic structural diagram of a sludge roasting and activated carbon manufacturing device according to the present invention.

As shown in FIG. 6, the sludge roasting and activated carbon manufacturing device of the present invention includes a hoisting apparatus 22, a feeding apparatus 23, a rotary kiln 24, a material receiving apparatus 25 and a tail gas recovery apparatus 26, where a discharge end 2102 of the belt conveyor 21 is connected to a feed end 2201 of the hoisting apparatus 22; a discharge end 2202 of the hoisting apparatus 22 is connected to a feed end 2301 of the feeding apparatus 23; a discharge end 2302 of the feeding apparatus 23 is connected to a feed end 2401 of the rotary kiln 24; and a discharge end 2402 of the rotary kiln is provided with the material receiving apparatus 25 and the tail gas recovery apparatus 26. During sludge roasting and activated carbon manufacturing, flue gas generated in the rotary kiln 24 is recycled by the tail gas recovery apparatus 26.

The work process of the present invention is as follows:

For residual sludge generated by an urban sewage plant, the sludge is evenly applied by using the stock distributing and sludge receiving apparatus 20 onto the lower-layer upper-side flat plate conveyor belt 1, the lower-layer bottom-side flat plate conveyor belt 2, the upper-layer bottom-side flat plate conveyor belt 3 and the upper-layer top-side flat plate conveyor belt 4. The sludge on the flat plate conveyor belts absorbs solar energy for water evaporation in the evaporator box, and distilled water on inner sides of the upper flat plate 18 and the lower plate 19 rapidly flows downwards to a water outlet 28 and is discharged for recycling or discharged to a standard level. When a moisture content of the sludge is lower than 10%, the sludge is stripped from the flat plate conveyor belts by the stock distributing and sludge receiving apparatus 20, and falls on the belt conveyor 21 in a centralized manner, and then is conveyed to the hoisting apparatus 22 by the flat plate conveyor 21 and put into the feeding apparatus 23 by using the hoisting apparatus 22. The feeding apparatus 23 feeds a certain quantity of the sludge into the rotary kiln 24, where the quantity of fed sludge is controlled by temperature and pressure inside the rotary kiln 24.

The sludge is roasted in the rotary kiln 24 to form granular activated carbon, and the granular activated carbon formed by means of roasting is collected and discharged by the material receiving apparatus 25 at an outlet of the rotary kiln 24. Exhaust gas generated during sludge roasting and activated carbon manufacturing is recycled by the tail gas recovery apparatus 26. The granular activated carbon manufactured by means of roasting may be further processed into powdered activated carbon.

Other parts that are involved in the present invention but not described herein are implemented by using the prior art.

What is claimed is:

1. A sludge recycling treatment system of an urban sewage plant, comprising:
    a traction apparatus;
    a closed solar sludge drying device; and
    a sludge roasting and activated carbon manufacturing device,
    wherein
    the closed solar sludge drying device comprises an upper flat plate manufactured from a transparent material, a lower plate and an evaporator box consisting of surrounding frames, wherein the evaporator box is provided with at least two sets of upper and lower flat plate conveyor belts;
    each flat plate conveyor belt is provided with a respective traction plate on each of two ends thereof;
    each traction plate is connected to one end of a corresponding traction rope, and another end of the corresponding traction rope is connected to the traction apparatus;
    each set of the flat plate conveyor belts is pulled by a corresponding traction rope on each of two ends thereof to run back and forth inside the evaporator box; and
    the evaporator box is further provided with a stock distributing and sludge receiving apparatus, and a belt conveyor is disposed under a discharge port of the stock distributing and sludge receiving apparatus,
    wherein
    the sludge roasting and activated carbon manufacturing device comprises a hoisting apparatus, a feeding apparatus, a rotary kiln, a material receiving apparatus and a tail gas recovering apparatus, wherein a discharge end of the belt conveyor is connected to a feed end of the hoisting apparatus;
    a discharge end of the hoisting apparatus is connected to a feed end of the feeding apparatus;
    a discharge end of the feeding apparatus is connected to a feed end of the rotary kiln; and
    a discharge end of the rotary kiln is provided with the material receiving apparatus and the tail gas recovering apparatus,
    wherein
    the at least two sets of upper and lower flat plate conveyor belts include a lower-layer top-side flat plate conveyor belt, a lower-layer bottom-side flat plate conveyor belt, an upper-layer bottom-side flat plate conveyor plate and an upper-layer top-side flat plate conveyor plate; and
    the traction apparatus includes an upper-layer top-side conveyor belt leftward traction apparatus, an upper-layer top-side conveyor belt rightward traction apparatus, a lower-layer top-side conveyor belt leftward traction apparatus, a lower-layer top-side conveyor belt rightward traction apparatus, an upper-layer bottom-side conveyor belt leftward traction apparatus, an upper-layer bottom-side conveyor belt rightward traction apparatus, a lower-layer bottom-side conveyor belt leftward traction apparatus and a lower-layer bottom-side conveyor belt rightward traction apparatus that are connected to the corresponding traction ropes.

2. The sludge recycling treatment system of an urban sewage plant according to claim 1, wherein the two sets of flat plate conveyor belts are arranged on a structure having a slope, and multiple conveyor belt supporting members are disposed under each of the two sets of flat plate conveyor belts inside the evaporator box.

3. The sludge recycling treatment system of an urban sewage plant according to claim 1, wherein the upper flat plate is manufactured by using a glass product or an organic transparent plastic; and distilled water generated by means of exposing inner sides of the upper flat plate and the lower plate to sunlight rapidly flows downwards to a water outlet and is discharged for recycling.

4. The sludge recycling treatment system of an urban sewage plant according to claim 1, wherein the upper flat plate uses a single-layer or double-layer structure, and when being of a double-layer structure, the upper flat plate is installed in a combined and hollow manner.

5. The sludge recycling treatment system of an urban sewage plant according to claim 2, wherein the two sets of flat plate conveyor belts inside the evaporator box are stepped concave-convex conveyor belts that are formed by means of welding of a T-section steel and a steel plate, and a material thereof is stainless steel or anti-corrosion carbon steel.

6. The sludge recycling treatment system of an urban sewage plant according to claim 1, wherein the traction ropes are made of stainless steel.

7. The sludge recycling treatment system of an urban sewage plant according to claim 3, wherein the two sets of flat plate conveyor belts inside the evaporator box are provided with lubricating apparatuses on two ends thereof, wherein the lubricating apparatuses are filled inside with lubricating grease; and bottom side lubrication holes are disposed at the bottom of the lubricating apparatuses, so that the lubricating grease is applied through the bottom side lubrication holes onto contact surfaces between the flat plate conveyor belts and the supporting members.

* * * * *